Oct. 6, 1925.

J. A. PILCHER 1,556,024

CAR TRUCK

Original Filed Feb. 11, 1921  2 Sheets—Sheet 2

INVENTOR
JOHN A. PILCHER
BY
B.W. Kadel.
ATTORNEY

Patented Oct. 6, 1925.

1,556,024

UNITED STATES PATENT OFFICE.

JOHN A. PILCHER, OF ROANOKE, VIRGINIA.

CAR TRUCK.

Continuation of application Serial No. 444,168, filed February 11, 1921. This application filed August 11, 1922. Serial No. 581,074.

*To all whom it may concern:*

Be it known that I, JOHN A. PILCHER, a citizen of the United States, residing at Roanoke, in the county of Roanoke and State of Virginia, have invented certain new and useful Improvements in Car Trucks, of which the following is a specification.

This invention relates to car trucks and has among its objects to provide improved means for supporting the car body, and for distributing the superimposed car body loads among the various wheels of the trucks. In the usual truck construction the load from the car body is applied to each of two trucks at a single point, called the center plate. The weights upon these center plates are not subject to change due to warping of the car body in crossing uneven tracks. But by supporting the load, as in the present invention, at two points upon each truck, one over or near each side frame member, much material can be saved in both the car body and the truck, and first cost greatly reduced, as well as reducing the continued operating costs. But the problem of unequal loading becomes important when a car body is supported at four points instead of two, for as the car passes over unequal track there is a tendency not only to change the loading upon the four supporting points, but also to produce changes in wheel loading within each of the trucks.

It is to provide means for overcoming both of these difficulties in such a car and trucks that the present invention is directed and it is particularly intended for use in connection with cars having twelve or more wheels.

With the foregoing general objects in view, the invention consists of the formation, combination and arrangement of parts as set forth particularly in the appended claims, the various elements being co-ordinated to produce improvements generally in this art. The present application is a continuation in part of my co-pending application, Serial No. 444,168, filed February 11, 1921.

Figure 1:
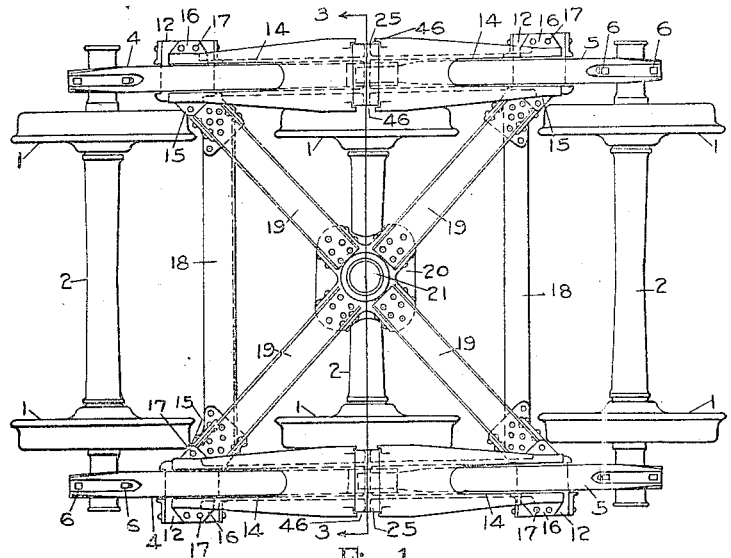
Figure 2:
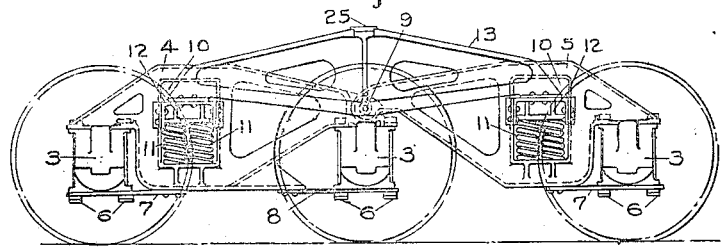
Figure 3:
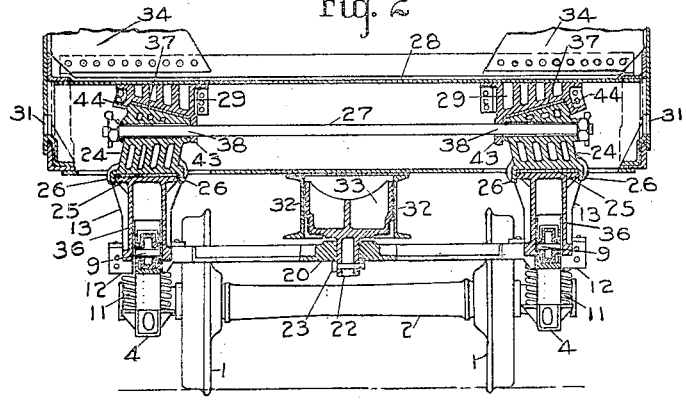
Figure 4:
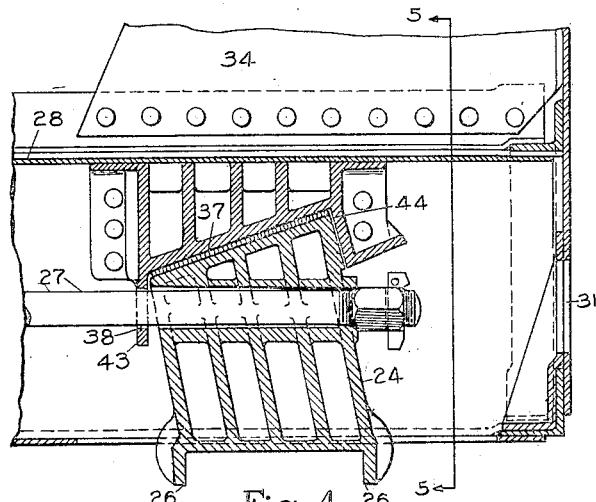
Figure 5:
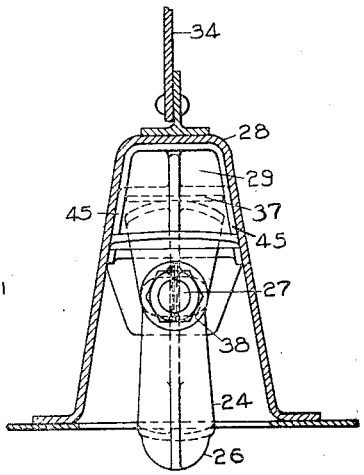
Figure 6:
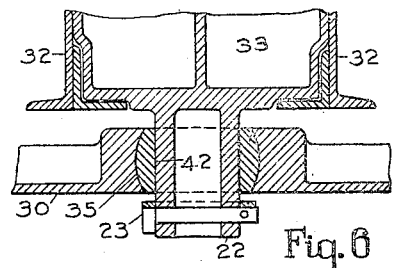
Figure 8:
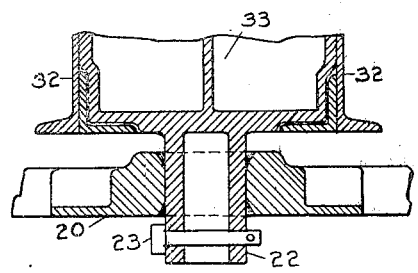
Figure 7:
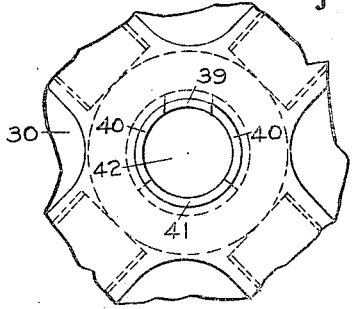

In the drawings, Fig. 1 is a plan view of a six wheel truck, constructed in accordance with the principles of the present invention. Figure 2 is a side elevational view of the same. Figure 3 is a transverse vertical section taken through the center of the truck and showing the manner of supporting the ends of the car body upon the truck structure. This section is taken on a plane approximately co-incident with the line 3—3 of Figure 1. Figure 4 is a fragmentary sectional view showing in enlarged scale a portion of the car body at the same point as shown in Figure 3. Figure 5 is a vertical sectional view of a portion of the car body over the truck, the section being taken on the line 5—5 of Figure 4. Figure 6 is a fragmentary vertical sectional view of a preferred form of trunnion and co-operating truck member for the point of articulation of the truck, taken substantially on the same plane as the trunnion illustrated in Figure 3. Figure 7 is a fragmentary plan view of the truck member at the point of articulation of which Figure 6 is the vertical section. This view shows the construction of the multiple piece ball, necessary for insertion in the spherical socket. Figure 8 is a sectional view of another form of the trunnion and the truck member for the point of articulation of the truck and is an enlarged view of the construction shown in Figure 8.

Referring to these drawings, which show one embodiment of the invention, the truck has six wheels indicated by the numeral 1, mounted in pairs upon the axles 2. The axles are journaled in the usual oil boxes 3, which are secured to the side frame members 4 and 5 by means of the bolts 6 and box tie bars 7 and 8. The side frames are outside of the wheels, thereby making the distance from the side of the car in to the side frames relatively short. This is of importance in the present method of supporting and carrying the car body inasmuch as the moments in the body bolster of the car are proportionally reduced. It will be noted that each side of the frame section 4 carries one end oil box and one middle oil box, the other frame section 5 carries the other end oil box. The two frame sections are hinged together for vertical movement at 9, immediately over the middle oil boxes. The frame sections at the two sides of the truck are similar in these respects.

Each of the four frame sections has the customary bolster window opening 10 with load-carrying springs 11 positioned within this opening and supported directly upon the side frame sections. The springs are so located along the frame sections as to put an equal load upon each oil box on a side of the truck when equal loads are applied to the two groups of springs along that side of the truck.

Resting upon the top of the springs 11 and guided for vertical sliding movement in the window openings 10 in the side frame sections are the spring caps 12 which also serve, with certain later described cross members, as guides, or means for holding the side frames in correct positions both laterally and longitudinally of the truck and for taking care of the lateral and longitudinal forces.

The load of the car body is applied to the spring caps 12 by means of the central equalizer beams 13. There is one of these equalizers on each side of the truck, extending from one spring cap to the other on the same side of the truck. Each of the equalizers 13 is preferably cast in a single piece, but is bifurcated at its ends, as at 14, to provide a space for the upper portion of the side frame sections 4 and 5 and permits vertical movement of these equalizers upon the spring 11. The equalizers are connected above the interval that is provided for the side frame, between the side portions 36 of the equalizer, the space being only sufficient for the necessary clearances. The equalizers rest upon the spring caps 12 and the ends of the same are provided with pierced flanges 15 and 16 so that the equalizer may be rigidly attached to the spring caps as by means of the rivets 17. It will thus be seen that the load is all carried on line with the side frames of the truck, none of it being applied at the center.

The four spring caps 12 of each truck are joined together and held in constant relationship transversely and longitudinally of the truck by means of a frame work of structural steel, consisting of a pair of transverse cross members 18, and a pair of X-members 19, these together with the central pivot casting 20 constituting a frame of platform construction. The X-members are joined together at the center of the truck by means of the pivot casting 20, this latter having a vertical opening 21 for co-operation with a trunnion 22 which depends from the car body.

It will be understood that the center casting 20, or 30, together with the frame work, does not receive the vertical load of the body at the center of the truck. The trunnion or pivot is provided and arranged for swiveling and guiding purposes and to hold the truck and body together against horizontal displacement. The lateral forces from the body are transmitted to the truck largely through these members, however, and all the forces from impact of cars and the retarding forces from brake applications are transmitted through the same. Hence laterally and longitudinally this frame work that connects the spring caps, and that carries the center pivot, is made exceedingly stiff and rigid.

Vertically, however, it is desired that the wheels may have practically unrestricted movement with respect to each other so as to follow any conditions of track surface without change of wheel loads, and without hindrance from the frame work, therefore this frame work is made exceedingly flexible vertically. By this construction it is allowed to warp itself with practically no change in the loads upon the group of springs 11, and also without setting up disastrous stresses in the various members of the frame work.

The car body load is applied to the equalizer beams 13 at the center of the latter and directly over the side frames of the truck by means of the conical rollers or rockers 24 A steel bearing plate 25 is inserted beneath each rocker, because of the concentration of weight, and flanges 26 are provided on the lower ends of the rockers to overlie the side of the equalizers in order to keep the rocker in position upon the equalizers transversely the truck.

The lower faces of the rockers and the seats for the same upon the equalizers are substantially horizontal, while the top surfaces of the rockers and the seats for the same upon the car body are inclined. By this means the necessary swiveling action of the truck beneath the car body is obtained, and at the same time all the spreading action from the conical rollers are kept out of the truck and are restricted to the car body where they are more easily taken care of. The rockers are held against spreading action by means of the transverse tie rod which connects the rockers on each side of the truck. This tie rod is indicated by 27 in the drawings. In addition to the tie rod in case of the breakage of the same the upper end of the rockers 24 is recessed in the body member casting 29 and retained against lateral displacement by the downwardly extending walls 43 and 44 of the body rocker seat casting, in conjunction with the flange 26 of the rocker which overlie the sides of the equalizers. The car body rests upon the top surface of the two rockers 24 of each truck thereby being supported at four points. The ordinary open top car has enough torsional flexibility to admit of its being supported at four points, and the body will warp itself enough to prevent any disastrous changes in load upon the rockers.

The car body is preferably formed in a special manner for use with this method of load carrying. In the absence of a center bearing plate the body bolster 28 may be made of less strength and weight than usually necessary and may be formed of steel plate bent into trough shape and extending up into the cavity of the car. The cavity of the trough is open from beneath the car and the rockers 24, and tie rod 27 are disposed within this space. Upper bearing castings 29 are secured to the bolster 28 immediately over the rockers and these transmit the loads from the bolster to the rockers, steel bearing plates 37 being applied between the castings and the rockers. The bolster 28 is securely attached to the car sides and additionally reinforced as by the gusset 34. Holes 31 are cut in the car sides at the ends of the bolsters 28 and through these the rocker tie rods 27 may be passed. The tie rods 27 also pass through the openings 38 formed in the downwardly extending wall 43 of the casting 29. By this means the tie rods together with the rockers will be lifted with the car body when untrucking.

The body rocker seat casting 29 is provided with downwardly extending walls 45 on each side of the seat for the rocker 24. These walls limit the movement of the rocker across the seat, preventing displacement from its proper position longitudinally the car. The rocker 24 is provided with downwardly extending lugs or flanges 26 which engage recesses 46 on each side of the equalizer 13 at the center of rocker seat 25, these engaging lugs prevent the displacement of the rocker from the proper position on the seat at the lower end longitudinally the equalizer.

The car has the customary center sills 32 which receive the draft forces. The casting 33, which carries the body trunnion 22, is secured between the center channels 32.

I have thus provided an improved method of carrying the weight of a car in a satisfactory manner and have provided a truck and car body arrangement of lower first cost, less weight, and greater economy of operation. The load from the car sides is not carried in to the usual center plate by the body bolster and then back to the side frames of the truck by means of a truck bolster, but is transferred from the body of the car to the truck side frames directly on line with the latter. By eliminating many of the customary load-carrying parts and reducing the size of others, the construction is greatly simplified and more of the space about the truck is made available for such accessories as the brakes.

Having thus described a preferred embodiment of my invention, what I claim is:

1. In car construction, a car body, a supporting truck, and rockers interposed between the body and the center of the truck at opposite sides thereof through which all of the load of the car body is transferred to the truck, the said rockers being of conical form and arranged with the truck bearing faces thereof horizontal and the body bearing faces inclined.

2. In car construction, a car body, a supporting truck, rockers interposed between the car body and the center of the truck at opposite sides thereof through which all of the load of the car body is transferred to the truck, the said rockers being of conical form and arranged with the truck bearing faces thereof horizontal and the body bearing faces inclined, and a tension rod connecting the rockers.

3. In car construction, a car body, a supporting truck, rockers interposed between the body and the center of the truck at opposite sides thereof through which all of the load of the car body is transferred to the truck, the said rockers being of conical form and arranged with the truck bearing faces thereof horizontal and the body bearing faces inclined, and a tension rod connecting the rockers, and means carried by the car body for the attachment thereto of the said tension rod.

4. In car construction, a car body, a supporting truck, rockers interposed between the body and the truck, the same being conical of form and arranged with the bearing faces inclined with respect to each other, the body rocker seat members being provided with downwardly extending walls at the inner and outer sides of the upper end of the rockers transversely the car, and the rockers being provided with downwardly extending flanges engaging the inner and outer sides of the truck rocker seat members.

5. In car construction, a car body, a supporting truck, rockers interposed between the body and the truck, the body rocker seat members being provided with downwardly extending walls at each side of the upper end of the rockers, longitudinally the car, and the rockers being provided with downwardly extending flanges co-operating with recesses in the inner and outer sides of the truck rocker seat member.

In testimony whereof I affix my signature.

JOHN A. PILCHER.